United States Patent
Kawai

(10) Patent No.: US 12,519,494 B2
(45) Date of Patent: Jan. 6, 2026

(54) ANTENNA UNIT AND TRANSMITTER

(71) Applicant: Pacific Industrial Co., Ltd., Gifu-ken (JP)

(72) Inventor: Tomoya Kawai, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 301 days.

(21) Appl. No.: 18/282,117

(22) PCT Filed: Sep. 6, 2021

(86) PCT No.: PCT/JP2021/032611
§ 371 (c)(1),
(2) Date: Sep. 14, 2023

(87) PCT Pub. No.: WO2023/032187
PCT Pub. Date: Mar. 9, 2023

(65) Prior Publication Data
US 2024/0171201 A1    May 23, 2024

(51) Int. Cl.
*H04B 1/04*    (2006.01)
*H01Q 7/00*    (2006.01)

(52) U.S. Cl.
CPC .................. *H04B 1/04* (2013.01); *H01Q 7/00* (2013.01)

(58) Field of Classification Search
CPC .......... H04B 1/04; H01Q 7/00; H01Q 1/2241; H01Q 1/362; H01Q 21/29
USPC ...................................................... 455/127.1
See application file for complete search history.

(56) References Cited

U.S. PATENT DOCUMENTS

| 2010/0231468 | A1 | 9/2010 | Ogino et al. |
| 2014/0015341 | A1* | 1/2014 | Kagami ................. H02J 50/12 307/104 |
| 2015/0048689 | A1* | 2/2015 | Ookawa ................. B60L 3/003 307/104 |
| 2017/0307661 | A1* | 10/2017 | Louzir ................. H01Q 1/2208 |
| 2019/0280372 | A1* | 9/2019 | Terashita ................. H01Q 1/52 |

FOREIGN PATENT DOCUMENTS

| EP | 3 330 108 A1 | 6/2018 |
| JP | 2005-134942 A | 5/2005 |
| JP | 2013-214940 A | 10/2013 |
| JP | 2015-035644 A | 2/2015 |
| JP | 2016-076835 A | 5/2016 |
| WO | WO 2009/060735 A1 | 5/2009 |

OTHER PUBLICATIONS

International Search Report with a mailing date of Nov. 16, 2021, in connection with International Application No. PCT/JP2021/032611.

* cited by examiner

*Primary Examiner* — Don N Vo
(74) *Attorney, Agent, or Firm* — Wolf, Greenfield & Sacks, P.C.

(57) ABSTRACT

An antenna unit is included in a transmitter configured to transmit data. The antenna unit includes a loop antenna and a helical parasitic element. The loop antenna is disposed within a housing of the transmitter and is supplied with power. The helical parasitic element is disposed outside the housing. The helical parasitic element is electromagnetically coupled to the loop antenna and includes two open ends.

5 Claims, 3 Drawing Sheets

ANTENNA UNIT AND TRANSMITTER

CROSS REFERENCE TO RELATED APPLICATION

This Application is a national stage filing under 35 U.S.C. 371 of International Patent Application Serial No. PCT/JP2021/032611, filed Sep. 6, 2021, entitled "ANTENNA UNIT AND TRANSMITTER." The entire content of this application is incorporated herein by reference in its entirety.

TECHNICAL FIELD

The present disclosure relates to an antenna unit included in a transmitter and a transmitter.

BACKGROUND ART

A transmitter configured to transmit data includes a transmission antenna for transmitting the data. Patent Literature 1 discloses that an antenna device, which is a transmission antenna, is incorporated in a case of a portable device serving as a transmitter. The portable device of Patent Literature 1 is a transmitter used in a keyless system of a vehicle.

CITATION LIST

Patent Literature

Patent Literature 1: Japanese Laid-Open Patent Publication No. 2015-35644

SUMMARY OF INVENTION

Technical Problem

In some cases, the portable device disclosed in Patent Literature 1 is used as a transmitter in another system. In other words, an existing transmitter may be used for other purposes. In such a case, when the transmission output of the transmitter is insufficient, it is desirable to increase the transmission output without changing the hardware including the transmission antenna of the transmitter or adding a device requiring a power supply.

Solution to Problem

In a first aspect of the present disclosure, an antenna unit included in a transmitter configured to transmit data includes a loop antenna and a helical parasitic element. The loop antenna is disposed within a housing of the transmitter and is supplied with power. The helical parasitic element is disposed outside the housing and is electromagnetically coupled to the loop antenna and including opposite ends that are open ends.

In a second aspect of the present disclosure, a transmitter configured to transmit data includes a housing, a loop antenna that is disposed within the housing and is supplied with power, and a helical parasitic element disposed outside the housing. The helical parasitic element is electromagnetically coupled to the loop antenna and including opposite ends that are open ends.

With these configurations, when transmission power is supplied to the loop antenna of the transmitter, a magnetic field and an electric field are generated around the loop antenna, so that energy is radiated from the loop antenna. Outside the housing, an induced current flows through the helical parasitic element, which is coupled to the magnetic field of the loop antenna. As compared to a comparative example in which an element disposed outside a housing is formed in a linear shape, an induced current larger than that in the comparative example flows through the helical parasitic element due to its helical structure.

A potential difference is created between the vicinity of each of the open ends and other sections in the helical parasitic element through which the induced current flows. This generates an electric field also in the helical parasitic element. As a result, the energy received from the loop antenna is efficiently radiated as radio waves by using the helical parasitic element. This increases the transmission output from the transmitter as compared with a case in which energy is radiated as radio waves from a loop antenna of the transmitter alone. If the transmission power to the loop antenna is the same, the communication distance from the transmitter can be extended. Therefore, even in a case of an existing transmitter, the transmission output of the transmitter can be increased only by adding the helical parasitic element to the outside of the housing, without changing the hardware including the loop antenna of the transmitter and without adding a device requiring a power supply.

In the above-described antenna unit, the helical parasitic element preferably has a total length of at least $0.3\lambda$, where $\lambda$ is a wavelength at an operating frequency of the loop antenna.

In the above-described antenna unit, the loop antenna is preferably mounted on a substrate disposed in the housing and includes an opening plane in a section surrounded by the loop antenna. The helical parasitic element is preferably disposed such that an axis of a helix of the helical parasitic element and a perpendicular to the opening plane are parallel to each other.

In the above-described antenna unit, the helical parasitic element preferably includes a first end and a second end opposite to each other in a direction in which an axis of a helix of the helical parasitic element extends. A wavelength at an operating frequency of the loop antenna is preferably represented by $\lambda$. A position $0.02\lambda$ away from the first end in the direction in which the axis extends is preferably defined as a first designated position. A position $0.02\lambda$ away from the second end in the direction in which the axis extends is preferably defined as a second designated position. The loop antenna is preferably disposed in a range between the first designated position and the second designated position.

DESCRIPTION OF EMBODIMENTS

An antenna unit and a transmitter according to one embodiment will now be described.

A transmitter has, for example, substantially the same configuration as the transmitter of a tire condition monitoring apparatus. In other words, the transmitter is an existing transmitter. Although not illustrated, the tire condition monitoring apparatus includes transmitters and a receiver. Each transmitter is attached to one of the four wheel assemblies. The receiver is installed in the vehicle. Each transmitter is attached to the wheel or the tire of the corresponding wheel assembly. The transmitter is disposed in the internal space of the tire.

The transmitter includes a housing, a tire condition detecting unit, a substrate, a transmission circuit, and a loop antenna. The housing accommodates the tire condition detecting unit, the substrate, the transmission circuit, and the loop antenna. The transmitter wirelessly uses the transmission circuit and the loop antenna to transmit a data signal including information of the tire detected by the tire condition detecting unit to the receiver. The tire condition monitoring apparatus monitors the condition of the tire by receiving the data signal transmitted from the transmitter at the receiver.

The transmitter of the tire condition monitoring apparatus has a high environmental resistance so as to withstand the environment in the tire such as moisture and corrosive gas in the tire. In order to provide a high environmental resistance, the housing of the transmitter has a sealed structure. In addition, since the transmitter is attached to the wheel or the tire, which always receives a centrifugal force during traveling of the vehicle, the transmitter is reduced in size and weight. In order to reduce the size and weight of the transmitter, the housing is reduced in size, and the loop antenna is also reduced in size.

Thus, there is a demand for compact transmitters with a sealed structure that can also be used outdoors, for example, as a transmitter in a road surface temperature measuring system.

The road surface temperature measuring system includes at least one temperature measuring device including a transmitter and at least one receiver. The at least one temperature measuring device is located on the outdoor road. The temperature measuring device measures the temperature of the road and wirelessly transmits the measured temperature as a data signal from the transmitter to the receiver. The transmitter used in the road surface temperature measuring system includes a temperature sensor instead of a tire condition detecting unit. Hereinafter, an antenna unit used in a transmitter of a road surface temperature measuring system will be described.

Figure 1:
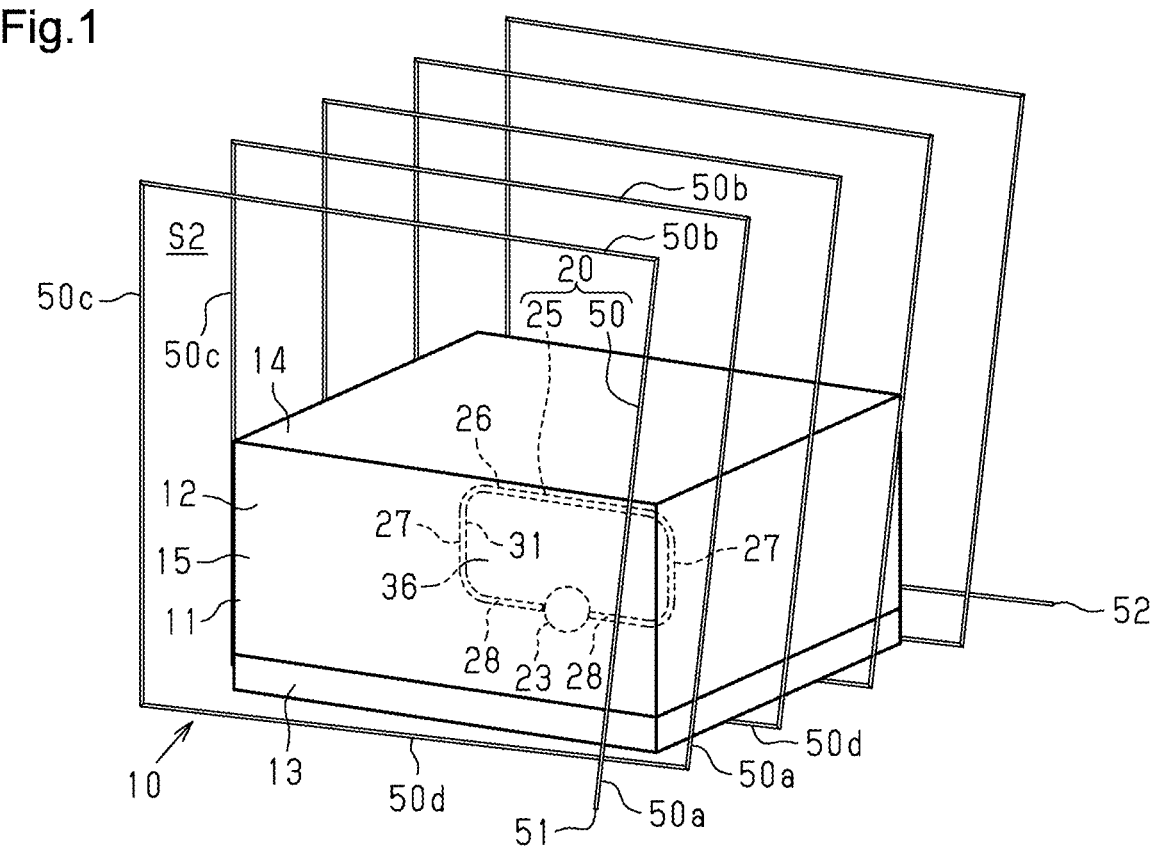
FIG. 1 is a perspective view of a transmitter and a helical parasitic element.

As shown in FIG. 1, an antenna unit 20 is included in a transmitter 10 configured to transmit data. The antenna unit 20 includes a loop antenna 25 and a helical parasitic element 50.

Transmitter

Figure 2:
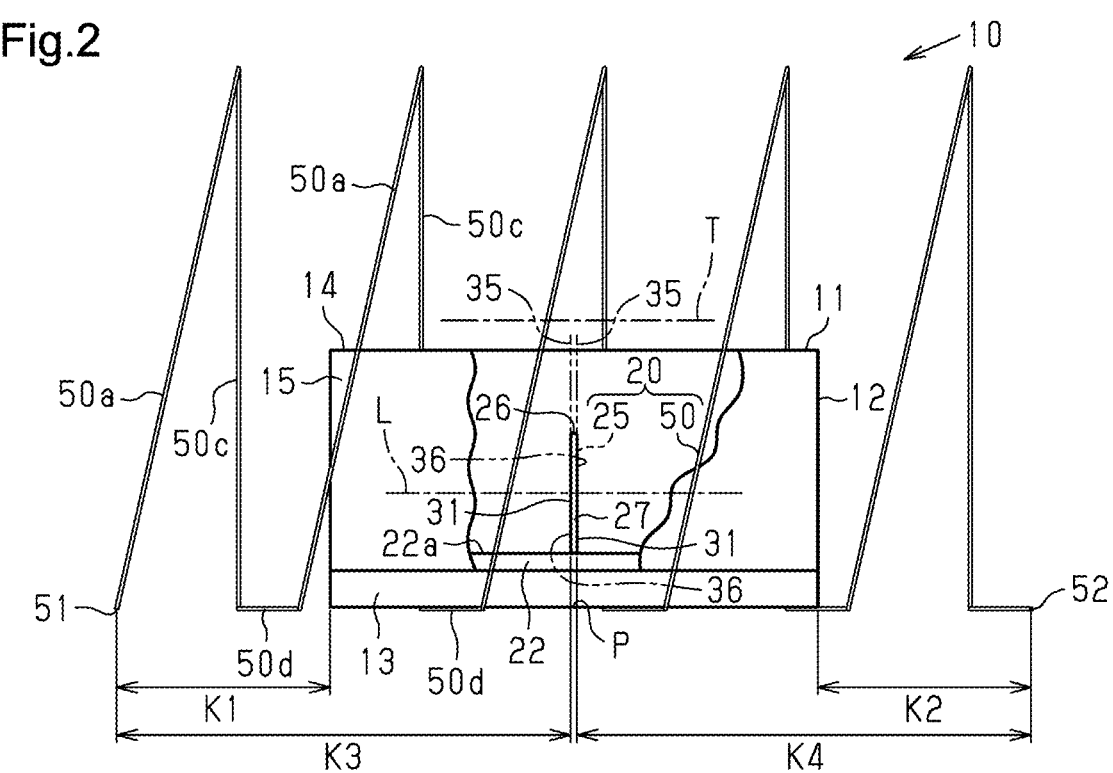
FIG. 2 is a side view of the transmitter the helical parasitic element shown in FIG. 1.
Figure 3:
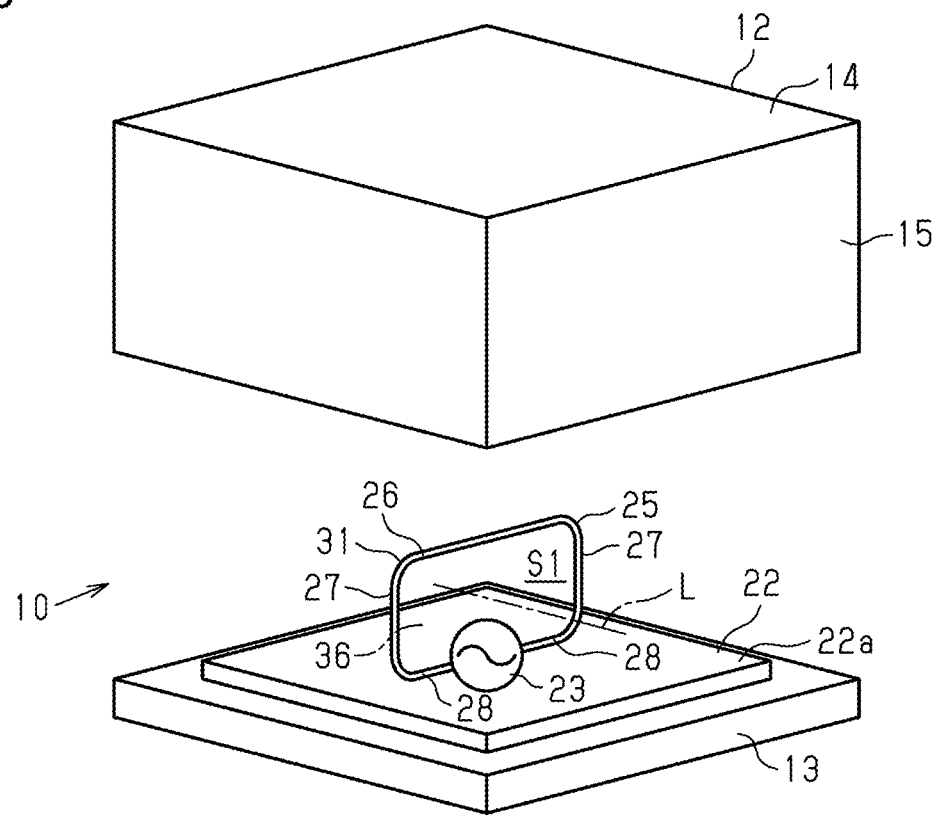
FIG. 3 is an exploded perspective view of the transmitter shown in FIG. 1.

As shown in FIGS. 1 to 3, a transmitter 10 includes a housing 11, a substrate 22, a power supply unit 23, a loop antenna 25, and a helical parasitic element 50. Since the power supply unit 23 is illustrated schematically, a detailed illustration thereof is omitted in FIG. 2. The loop antenna 25 is disposed in the housing 11. The helical parasitic element 50 is disposed outside the housing 11. The antenna unit 20, which is included in the transmitter 10, includes the loop antenna 25 and the helical parasitic element 50.

Housing

The housing 11 accommodates the substrate 22, the power supply unit 23, and the loop antenna 25.

The housing 11 includes a housing body 12 and a flat plate-shaped lid 13, which closes an opening of the housing body 12. The housing body 12 includes a first wall 14 and a second wall 15. The first wall 14 has the shape of a flat plate. The second wall 15 is a peripheral wall. The second wall 15 extends from a peripheral edge of the first wall 14 so as to have a rectangular tubular shape. The housing body 12 and the lid 13 are fixed to each other. By this fixing, the housing 11 has a sealed structure. The sealed structure prevents moisture, gas, and the like from entering the inside of the housing 11 from the outside. Therefore, the housing 11 has high environmental resistance. The housing 11 may have a sealed structure by filling the interior of the housing body 12 with resin. In this case, the housing 11 does not necessarily need to include the lid 13. External connection terminals for electrical connection or signal connection are not provided on the surface of the housing 11. For this reason, the housing 11 has a structure in which connection from the outside to the substrate 22 or the power supply unit 23 inside the housing 11 is impossible.

Substrate

The substrate 22 includes a plate surface 22a. The power supply unit 23 and a temperature sensor (not shown) are mounted on the plate surface 22a of the substrate 22. The power supply unit 23 is an electronic component including a transmission circuit and a controller (neither is shown). The power supply unit 23 modulates a signal detected by the temperature sensor into a radio signal, and then outputs transmission power of an operating frequency to the loop antenna 25. The operating frequency band may be an LF band, an MF band, an HF band, a VHF band, a UHF band, and a 2.4 GHz band.

Loop Antenna

The loop antenna 25, which is a transmission antenna, is manufactured by bending a metal wire, which is an example of a conductor. The loop antenna 25 includes a base portion 26, two extended portions 27, and two terminal connecting portions 28. In order to reduce the size and weight of the transmitter 10, the loop antenna 25 is reduced in size as much as possible.

Each of the two extended portions 27 protrudes from each end of the base portion 26 toward the substrate 22. The two terminal connecting portions 28 respectively protrude from ends of the extended portions 27 located on a side opposite to the base portion 26 so as to approach each other. Although not illustrated in detail, the terminal connecting portions 28 of the loop antenna 25 are electrically connected to the power supply unit 23. The loop antenna 25 is supplied with power from the power supply unit 23.

The loop antenna 25 is housed in the housing 11 such that the base portion 26 is close to the bottom of the housing body 12 and the extended portions 27 protrude from the opposite ends of the base portion 26 toward the substrate 22.

The loop antenna 25 and the substrate 22 define an opening region S1. The opening region S1 is surrounded by the loop antenna 25. The opening region S1 opens to an imaginary plane 35 extending along the metal wire. The imaginary plane 35 is a plane obtained by imaginarily extending the end edge 31 extending along the metal wire so as to surround the opening region S1. The loop antenna 25 includes an opening plane 36 in a section surrounded by the loop antenna 25. The opening plane 36 is orthogonal to the plate surface 22a of the substrate 22. A straight line orthogonal to the opening plane 36 is defined as a perpendicular L. The loop antenna 25 may be disposed on the substrate 22 such that the opening plane 36 is oblique with respect to the plate surface 22a.

Helical Parasitic Element

Figure 4:
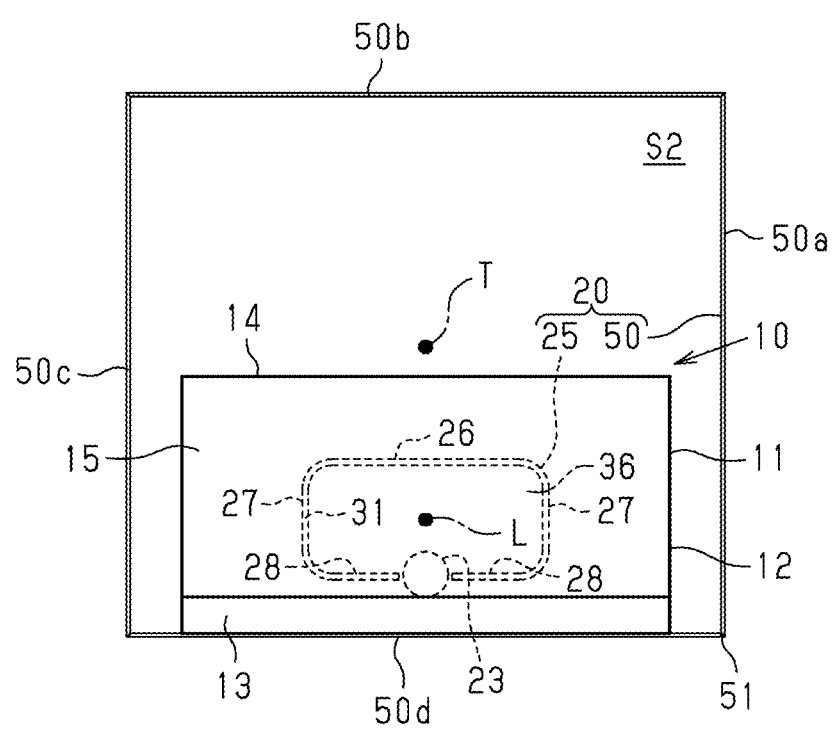
FIG. 4 is a front view of the transmitter the helical parasitic element shown in FIG. 1.

As shown in FIGS. 1, 2 and 4, the helical parasitic element 50 surrounds the transmitter 10 from the outside. The helical parasitic element 50 is made of a metal wire that is an example of a conductor. The helical parasitic element 50 is formed by helically winding a metal wire. The helical parasitic element 50 is located at a position where it can be electromagnetically coupled to the loop antenna 25. Being "electromagnetically coupled" refers to a state in which an induced current can be caused to flow through the helical parasitic element 50 by a magnetic field generated by the loop antenna 25.

The helical parasitic element 50 includes a first end 51 and a second end 52. The first end 51 is one end of the metal wire, and the second end 52 is the other end of the metal wire, which is located on the side opposite to the first end 51. The helical parasitic element 50 includes the first end 51 and the second end 52 opposite to each other in a direction in which an axis T of the helical parasitic element 50 extends. The axis T is a line passing through the center of the helix of the helical parasitic element 50. The first end 51 and the second end 52 of the helical parasitic element 50 are open ends. That is, the helical parasitic element 50 includes opposite ends that are open ends. The first end 51 and the second end 52 of the helical parasitic element 50 are not connected to the ground.

A view of the helical parasitic element 50 in a direction in which the axis T extends will be referred to as a front view of the helical parasitic element 50. The helical parasitic element 50 defines an opening region S2, which has a rectangular shape in the front view. The opening region S2 is a part surrounded by the helical parasitic element 50 in the front view. The opening region S2 is open at the opposite ends of the helical parasitic element 50 in the direction in which the axis T extends. The metal wire is bent such that its sections are spaced apart from each other in the direction in which the axis T extends, and that the helical parasitic element 50 has a rectangular frame shape in the front view. The rectangular frames formed by bending the metal wire have the same size in the front view of the helical parasitic element 50.

The helical parasitic element 50 includes first side sections 50a, second side sections 50b, third side sections 50c, and fourth side sections 50d. The first side sections 50a extend in the up-down direction in the front view of helical parasitic element 50. The second side sections 50b extend between the first side sections 50a and the third side sections 50c. The second side sections 50b extend horizontally. The third side sections 50c extend between the second side sections 50b and the fourth side sections 50d. The third side sections 50c extend vertically. The fourth side sections 50d extend horizontally from the third side sections 50c. The fourth side sections 50d extend between the third side sections 50c and the first side sections 50a.

In the direction in which the axis T extends, the first side sections 50a are parallel to each other, the second side sections 50b are parallel to each other, the third side sections 50c are parallel to each other, and the fourth side sections 50d are parallel to each other. All the first side sections 50a have the same length, and all the second side sections 50b have the same length. All the third side sections 50c have the same length, and all of the fourth side sections 50d have the same length. The distance between any two parallel side sections that are adjacent to each other in the direction in which the axis T extends is consistent for the first to fourth side sections 50a to 50d.

As long as the helical parasitic element 50 has a helical shape, side sections adjacent to each other in the direction in which the axis T extends do not necessarily need to be parallel to each other, and the distance between sections adjacent to each other may vary slightly. Further, the corresponding side sections may have different lengths.

The transmitter 10 is located within the opening region S2 in the front view of the helical parasitic element 50. The transmitter 10 is placed on the fourth side sections 50d of helical parasitic element 50. The transmitter 10 is disposed inside the first end 51 and the second end 52 of the helical parasitic element 50. The distance from the first end 51 to the surface of the housing 11 closest to the first end 51 in the direction in which the axis T extends is defined as K1. The distance from the second end 52 to the surface of the housing 11 closest to the second end 52 in the direction in which the axis T extends is defined as K2. The transmitter 10 is disposed inside the helical parasitic element 50 such that the distance K1 and the distance K2 are the same or substantially the same.

The helical parasitic element 50 is disposed outside the transmitter 10 such that the axis T is parallel to the perpendicular L of the opening plane 36 of the loop antenna 25. When the helical parasitic element 50 and the loop antenna 25 are viewed along the axis T and the perpendicular line L, the loop antenna 25 is located inside the helical parasitic element 50. The helical parasitic element 50 is disposed at a position where it is electromagnetically coupled to the loop antenna 25.

The distance between the first end 51 and the second end 52 in the direction in which the axis T of the helical parasitic element 50 extends is defined as the length of the helical parasitic element 50 in the axial direction. The transmitter 10 is arranged such that the central axis (not shown) of the loop antenna 25 is located on a center point P of the length of the helical parasitic element 50 in the axial direction.

The loop antenna 25 is disposed inside the first end 51 and the second end 52 of the helical parasitic element 50. The distance from the first end 51 to the end edge 31 of the loop antenna 25 closest to the first end 51 in the direction in which the axis T extends is defined as K3. The distance from the second end 52 to the end edge 31 of the loop antenna 25 closest to the second end 52 in the direction in which the axis T extends is defined as K4. The transmitter 10 is disposed inside the helical parasitic element 50 such that the distance K3 and the distance K4 are the same or substantially the same. The transmitter 10 may be disposed in the helical parasitic element 50 such that the distance K3 and the distance K4 are different from each other.

Function of Antenna Unit

When transmission power is input from the power supply unit 23 to the loop antenna 25, energy radiated from the loop antenna 25 is amplified using the helical parasitic element 50 and radiated as radio waves.

Gain of Antenna Unit

In the antenna unit 20, the use of the helical parasitic element 50 increases a gain Ga [dBi] as compared to a case in which the loop antenna 25 is used alone. The gain Ga [dBi] represents the sensitivity in the maximum sensitivity direction as a multiple of the sensitivity of an omnidirectional antenna, which has equal sensitivity in all directions.

While the gain Ga of the loop antenna 25 alone is about −13 [dBi], the gain Ga of the antenna unit 20, which includes the loop antenna 25 and the helical parasitic element 50, is improved to about −1 [dBi]. Therefore, the improvement relative to the case of the loop antenna 25 alone, is about 12 [dB].

Positions of Helical Parasitic Element and Loop Antenna

When the magnetic field coupling between the loop antenna 25 and the helical parasitic element 50 strengthen, the induced current flowing through the helical parasitic element 50 increases. As a result, the improvement [dB] of the antenna unit 20 is enhanced. In order to enhance the improvement [dB], it is preferable to define a range in which the loop antenna 25 can be arranged with respect to the helical parasitic element 50. The loop antenna 25 is preferably disposed inside the helical parasitic element 50 between the first end 51 and the second end 52 of the helical parasitic element 50.

Figure 5:
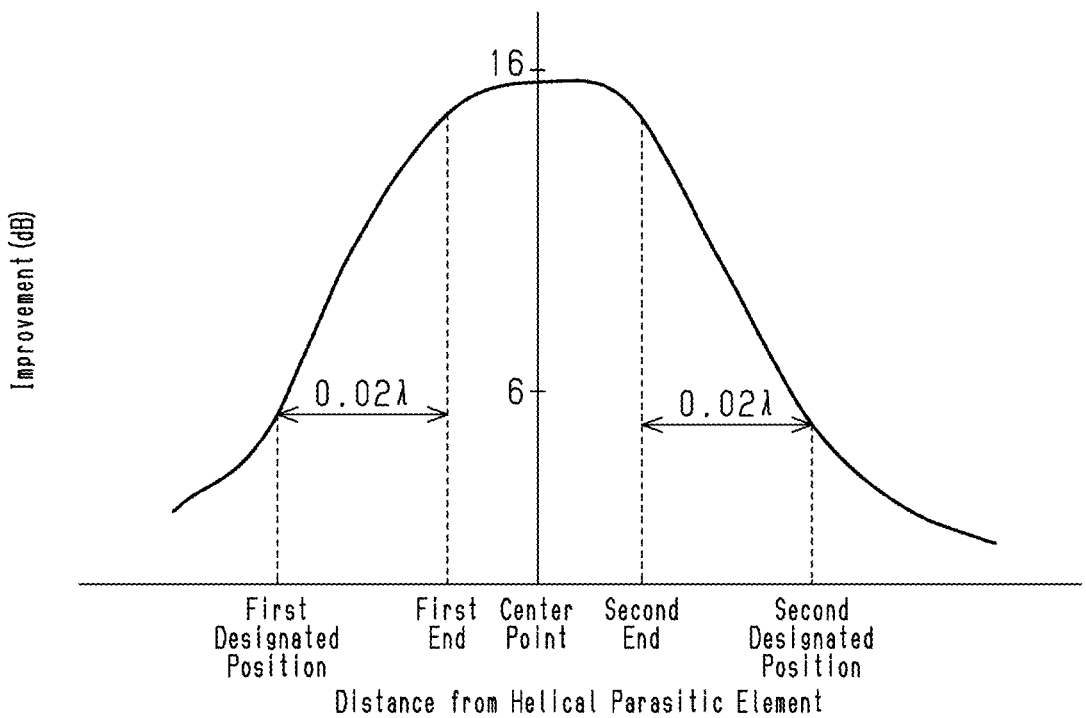
FIG. 5 is a graph showing a relationship between a distance from the helical parasitic element shown in FIG. 1 to a loop antenna and an improvement.

As shown in FIG. 5, when the loop antenna 25 is disposed at the center point P of the helical parasitic element 50, the improvement is maximized at about 15 [dB], which is particularly preferable. Even if the loop antenna 25 is disposed between the first end 51 and the second end 52 of the helical parasitic element 50, the improvement is about 14 [dB], which is preferable.

The loop antenna 25 may be disposed outside the helical parasitic element 50 so as to be away from one of the first end 51 and the second end 52 of the helical parasitic element 50 in the direction in which the axis T extends. The wavelength at the operating frequency of the loop antenna 25 is represented by $\lambda$.

If the distance from one of the first end 51 and the second end 52 to the loop antenna 25 is up to $0.02\lambda$, an improvement of about 6 [dB] is achieved even if the loop antenna 25 is away from the helical parasitic element 50 in the direction in which the axis T extends. The fact that an improvement of about 6 [dB] is achieved indicates that a transmission output twice as large as that of the loop antenna 25 alone is achieved.

A position $0.02\lambda$ away from the first end 51 in the direction in which the axis T extends is defined as a first designated position. A position $0.02\lambda$ away from the second end 52 in the direction in which the axis T extends is defined as a second designated position. The loop antenna 25 is preferably disposed in a range between the first designated position and the second designated position. Since the distance between the loop antenna 25 and the helical parasitic element 50 is $0.02\lambda$, part of the housing 11 is disposed inside the helical parasitic element 50.

Total Length of Helical Parasitic Element

In order to enhance the improvement [dB] of the antenna unit 20, the helical parasitic element 50 is caused to resonate with the radio waves radiated from the loop antenna 25. In order to cause the helical parasitic element 50 to resonate, it is preferable to define the range of the total length of the helical parasitic element 50. The length of the metal wire itself between the first end 51 and the second end 52 of the helical parasitic element 50 is referred to as the total length of the helical parasitic element 50.

Figure 6:
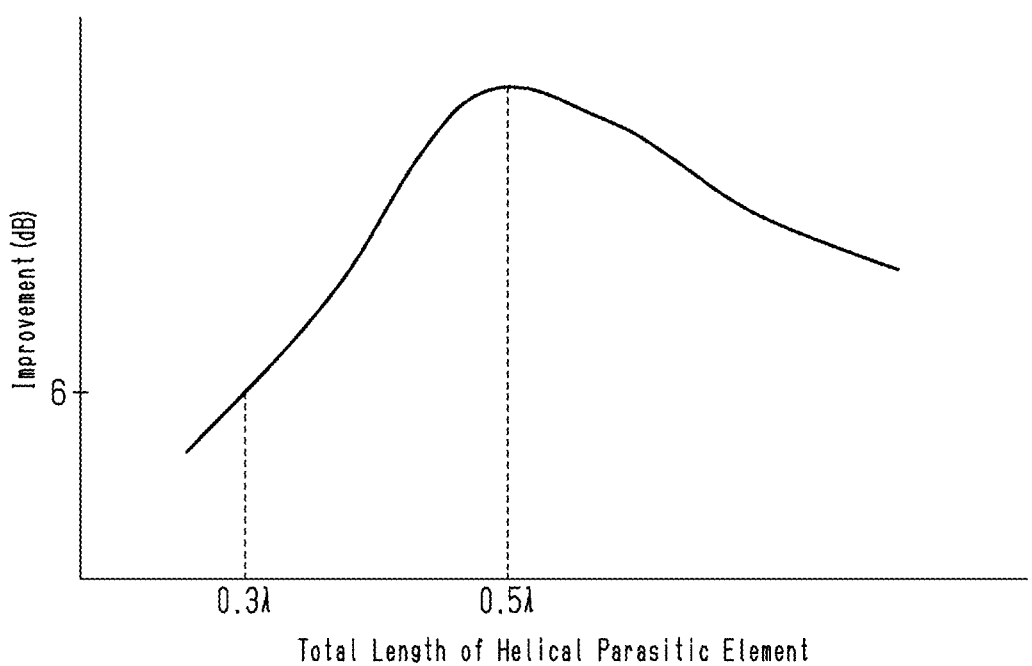
FIG. 6 is a graph showing a relationship between a total length of the helical parasitic element shown in FIG. 1 and an improvement.

As shown in FIG. 6, in order to achieve an improvement of 6 [dB] or more for the antenna unit 20, it is preferable for the total length of the helical parasitic element 50 to be $0.3\lambda$ or more. Since the improvement [dB] is maximized when the total length of the helical parasitic element 50 is about $0.5\lambda$, the total length of the helical parasitic element 50 is particularly preferably about $0.5\lambda$.

Operation

Operation of the present embodiment will now be described.

When transmission power is supplied to the loop antenna 25 and a current flows through the loop antenna 25, a magnetic field and an electric field are generated around the loop antenna 25, and energy is radiated from the loop antenna 25. Outside the housing 11, an induced current flows through the helical parasitic element 50 under the influence of the magnetic field from the loop antenna 25. A potential difference occurs between the vicinity each of the first end 51 and the second end 52, and the other portions in the helical parasitic element 50. As a result, an electric field is generated in the helical parasitic element 50. The energy received from the loop antenna 25 is efficiently radiated as radio waves by using the helical parasitic element 50.

The present embodiment has the following advantages.
(1) The antenna unit 20 includes the loop antenna 25 of the transmitter 10 and the helical parasitic element 50. The transmitter 10 includes the housing 11, the loop antenna 25, and the helical parasitic element 50.

The helical parasitic element 50 surrounds the loop antenna 25 or is close to the loop antenna 25. A linear parasitic element having the same total length as that of the helical parasitic element 50 is used as a comparative example. As compared with the comparative example, the helical parasitic element 50 is strongly affected by the magnetic field of the loop antenna 25. Thus, an induced current larger than that in the comparative example flows through the helical parasitic element 50. The energy received from the loop antenna 25 is efficiently radiated as radio waves by using the helical parasitic element 50. This increases the transmission output from the transmitter 10 as compared with a case in which radio waves are radiated from the loop antenna 25 alone. If the amount of power fed to the loop antenna 25 is the same, the communication distance from the antenna unit 20 can be extended.

The transmitter 10 is an existing transmitter that can also be used as a transmitter of a tire condition monitoring apparatus. The housing 11 of the transmitter 10 has a sealed structure, and the housing 11 and the loop antenna 25 are reduced in size. When a transmitter that can be used as a transmitter for a tire condition monitoring apparatus is used alone as the transmitter 10 for the road surface temperature measuring system, that transmitter may not have sufficient transmission output. In this case, by simply disposing the helical parasitic element 50 outside the housing 11, the transmission output of the transmitter 10 can be increased without changing hardware including the loop antenna 25 and without adding a device requiring a power supply.

(2) The total length of the helical parasitic element 50 is set to be $0.3\lambda$ or more. By setting the total length of the helical parasitic element 50 in this way, the helical parasitic element 50 is allowed to readily resonate with the radio wave from the loop antenna 25. For this reason, it is possible to increase the gain Ga of the antenna unit 20 to enhance the improvement [dB] as compared to the case of the loop antenna 25 alone. As a result, the transmission output of the transmitter 10 is increased.

(3) When the loop antenna 25 is disposed outside the helical parasitic element 50, the distance from one of the first end 51 and the second end 52 to the loop antenna 25 is set to $0.02\lambda$ or less. That is, the loop antenna 25 is disposed in the range between the first designated position and the second designated position. The magnetic field coupling between the loop antenna 25 and the helical parasitic element 50 strengthen as compared to a case in which the loop antenna 25 is disposed, for example, at a position outside the range between the first designated position and the second designated position. As a result, the transmission output of the transmitter 10 is increased.

(4) The helical parasitic element 50 is disposed such that the axis T of the helical parasitic element 50 and the perpendicular L to the opening plane 36 are parallel to each other. The magnetic field coupling between the loop antenna 25 and the helical parasitic element 50 strengthen as compared to a case in which at least one of the helical parasitic element 50 and the loop antenna 25 is disposed such that the axis T and the perpendicular L are not parallel to each other. This increases the transmission output of the transmitter 10.

(5) The helical parasitic element 50 has the first end 51 and the second end 52 as open ends, and is not electrically connected to the power supply unit 23. When compared to directly electrically connecting the helical parasitic element 50 with such open ends to the transmitter 10, the impact on the transmission circuit due to lightning strikes or static electricity on the loop antenna 25 is reduced.

The above-described embodiments may be modified as follows. The embodiments and the following modifications can be combined as long as the combined modifications remain technically consistent with each other.

Although the loop antenna 25 and the helical parasitic element 50 are formed of a metal wire as a conductor, the present invention is not limited thereto. The materials of the loop antenna 25 and the helical parasitic element 50 are not limited as long as they are conductors. The loop antenna 25 and the helical parasitic element 50 each be formed by a metal product made of a metal wire or a metal plate, or may each be formed of a lead including a single wire and a stranded wire. Alternatively, the loop antenna 25 and the helical parasitic element 50 may each be formed of a conductive plastic or a conductive rubber material. Furthermore, the loop antenna 25 and the helical parasitic element 50 may be formed by plating on the housing 11 made of plastic or ceramic or by a trace made of conductive paint. The loop antenna 25 may be formed by a conductor trace provided on a printed circuit board or a flexible substrate.

The electronic component provided on the substrate 22 of the transmitter 10 may be any electronic component such as a pressure sensor.

The transmitter 10 may be used as a transmitter of a system other than the road surface temperature measuring system.

The helical parasitic element 50 may be disposed such that the axis T of the helical parasitic element 50 is not parallel to the perpendicular L of the opening plane 36 of the loop antenna 25.

The loop antenna 25 may be disposed outside the range between the first designated position and the second designated position.

The loop antenna 25 may be manufactured by bending a single rectangular leaf spring. In this case, the loop antenna 25 is made of stainless steel, which is an example of a conductor. Also in this case, the loop antenna 25 includes a base portion 26, two extended portions 27, and two terminal connecting portions 28. Each of the base portion 26, the extended portions 27, and the terminal connecting portions 28 has the shape of an elongated plate.

In a front view of the helical parasitic element 50, the helical parasitic element 50 does not necessarily need to have a rectangular frame shape, but may have a round frame shape or a polygonal frame shape.

The transmitter 10 may be used as a receiver.

REFERENCE SIGNS LIST

L: Perpendicular, T: Axis, 10: Transmitter, 11: Housing, 20: Antenna Unit, 22: Substrate, 25: Loop Antenna, 35: Opening Plane, 50: Helical Parasitic Element, 51: First End as Open End, 52: Second End as Open End.

The invention claimed is:

1. An antenna unit included in a transmitter configured to transmit data, the antenna unit comprising:
a loop antenna that is disposed within a housing of the transmitter and is supplied with power; and
a helical parasitic element disposed outside the housing, the helical parasitic element being electromagnetically coupled to the loop antenna and including opposite ends that are open ends.

2. The antenna unit according to claim 1, wherein the helical parasitic element has a total length of at least $0.3\lambda$, where $\lambda$ is a wavelength at an operating frequency of the loop antenna.

3. The antenna unit according to claim 1, wherein
the loop antenna is mounted on a substrate disposed in the housing and includes an opening plane in a section surrounded by the loop antenna, and
the helical parasitic element is disposed such that an axis of a helix of the helical parasitic element and a perpendicular to the opening plane are parallel to each other.

4. The antenna unit according to claim 1, wherein
the helical parasitic element includes a first end and a second end opposite to each other in a direction in which an axis of a helix of the helical parasitic element extends,
a wavelength at an operating frequency of the loop antenna is represented by $\lambda$,
a position $0.02\lambda$ away from the first end in the direction in which the axis extends is defined as a first designated position,
a position $0.02\lambda$ away from the second end in the direction in which the axis extends is defined as a second designated position, and
the loop antenna is disposed in a range between the first designated position and the second designated position.

5. A transmitter configured to transmit data, the transmitter comprising:
a housing;
a loop antenna that is disposed within the housing and is supplied with power; and
a helical parasitic element disposed outside the housing, the helical parasitic element being electromagnetically coupled to the loop antenna and including opposite ends that are open ends.

* * * * *